(12) United States Patent
Smith

(10) Patent No.: US 8,613,163 B2
(45) Date of Patent: Dec. 24, 2013

(54) MASONRY WALL PROTECTION DEVICE

(76) Inventor: Jay R. Smith, Evansville, IN (US)

( * ) Notice: Subject to any disclaimer, the term of this patent is extended or adjusted under 35 U.S.C. 154(b) by 0 days.

(21) Appl. No.: 13/591,318

(22) Filed: Aug. 22, 2012

(65) Prior Publication Data

US 2013/0212843 A1  Aug. 22, 2013

Related U.S. Application Data

(60) Provisional application No. 61/626,697, filed on Sep. 30, 2011.

(51) Int. Cl.
*B25B 1/20* (2006.01)

(52) U.S. Cl.
USPC .................................. 52/3; 269/143; 269/249

(58) Field of Classification Search
USPC ................. 52/3, 100; 269/143, 149, 249, 276
See application file for complete search history.

(56) References Cited

U.S. PATENT DOCUMENTS

| | | | | |
|---|---|---|---|---|
| 2,950,912 A | * | 8/1960 | Blackmon et al. | 269/203 |
| 4,896,570 A | * | 1/1990 | Bourgeois | 81/64 |
| 6,089,556 A | * | 7/2000 | Whiteford | 269/149 |
| 7,353,640 B2 | * | 4/2008 | Stutler | 52/100 |

* cited by examiner

*Primary Examiner* — Jeanette E Chapman
*Assistant Examiner* — Daniel Kenny
(74) *Attorney, Agent, or Firm* — Gary K. Price

(57) ABSTRACT

A masonry wall protection device includes a first member, a second member and a tensioning belt. The second member includes a vertical second leg that defines an outer edge that includes a position slot, and a horizontal second leg. The first member includes a vertical first leg, and a horizontal first leg that has a top edge that defines a plurality of position slots and further defines a bore that is sized and shaped for sliding receipt of the horizontal second leg. The horizontal second leg is slidingly positioned through the bore so that the distance between the vertical first and second legs can be adjusted to approximately equal the width of the top of the masonry wall. The tensioning belt is positioned between the first and second members fully stretched such that the vertical legs are firmly positioned a selected distance apart.

18 Claims, 5 Drawing Sheets

MASONRY WALL PROTECTION DEVICE

CROSS REFERENCES TO RELATED APPLICATIONS

U.S. Provisional Application for Patent No. 61/626,697, filed Sep. 30, 2011, with title "Masonry Wall Protection Device" which is hereby incorporated by reference. Applicant claim priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention relates to an improved device for covering and protecting a newly laid block or brick wall from water and inclement weather and more particularly, to an improved device used to secure temporary weather sheeting to the top of the newly laid block or brick wall that is adjustable to varying wall widths.

2. Brief Description of Prior Art

There is an ongoing problem at every masonry job site—at the end of the work day or before a rain storm, covering up masonry walls to prevent water from getting into the cores of the block which will potentially cause freezing and cracking of the masonry walls. Plastic weather sheeting is commonly used at construction sites to protect a newly laid block or brick wall from water and inclement weather. Currently such weather sheeting is often draped over the top of the newly constructed wall in order to sufficiently protect, and then a heavy object, such as lumber or masonry block, is temporarily placed on top of the plastic sheeting in an effort to hold the sheeting in place. However, as is often the case the temporary object placed on top of the sheeting can be displaced by any number of events including a heavy wind, for example, causing the sheeting to blow off the wall. This then becomes not only a cleanup issue but the wall then becomes uncovered and unprotected.

While plastic weather sheeting remains the material of choice for covering and protecting newly laid block or brick wall, maintaining the sheeting on top of the wall for protection remains a concern in the art.

As will be seen from the subsequent description, the preferred embodiments of the present invention overcome shortcomings of the prior art.

SUMMARY OF THE INVENTION

Briefly stated, the present invention is directed to a device that safely and efficiently secures weather sheeting to newly laid masonry. The masonry wall protection device generally includes a first member, a second member and a tensioning belt. The first member includes a vertical first leg, and a horizontal first leg that has a top edge that defines a plurality of position slots that preferably extend the longitudinal length of the horizontal first leg. The second member includes a vertical second leg and a horizontal second leg. The vertical second leg has an outer edge that includes at least one position slot. The horizontal first leg of the first member further defines an inner bore that preferably extends the length of the horizontal first leg. The bore is sized and shaped for sliding receipt of the horizontal second leg of the second member such that the horizontal second leg is received and can be slidingly positioned through the bore so that the distance between the vertical legs of the first and second members is the approximate width of the top of the masonry wall.

Once the distance between the vertical legs is adjusted as described, a first end of the tensioning belt is positioned within the slot on the second member and an opposite end of the tensioning belt is selectively positioned in one of the positioning slots of the first member so that the belt extends between first and second member and is fully stretched so that the vertical legs are firmly positioned a selected distance apart.

DESCRIPTION OF THE PREFERRED EMBODIMENT

Figure 1:
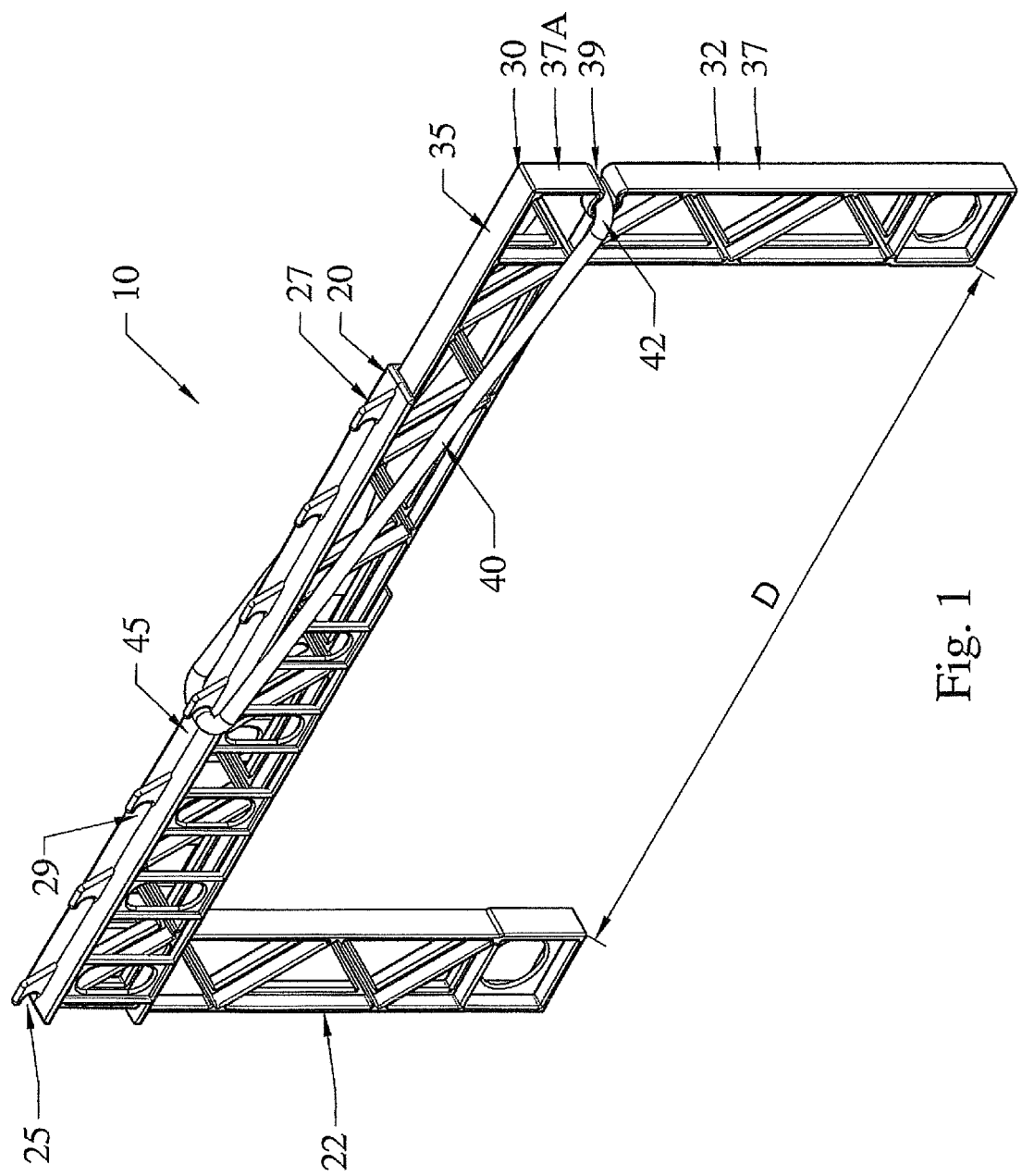
FIG. 1 is a perspective view of the preferred embodiment of the present invention, a masonry wall protection device used in protecting newly constructed masonry walls from inclement weather.

In accordance with the present invention, a device used for covering and protecting a newly laid block or brick wall from water and inclement weather is disclosed. More particularly, the described device relates to an apparatus used to secure temporary weather sheeting to the top of the newly laid block or brick wall. Specifically, it will be noted in the following description that the present system introduces a cost efficient and safe solution for not only temporarily installing the weather sheeting over the newly laid brick wall but also providing masons with a device that is adjustable to accommodate varying wall widths. The system introduces a solution that avoids the drawbacks associated with the prior art methods of using loose lumber and masonry block to hold down temporary weather sheeting. In the broadest context, the masonry wall protection device of the present invention consists of components configured with respect to each other so as to attain the desired objective.

The present invention is now exemplified by a particular embodiment which is illustrated in the accompanying drawings.

The masonry wall protection device designated as numeral 10 generally includes a first member 20, a second member 30 and a tensioning belt 40 for as will be described, accommodating varying masonry wall widths. As illustrated, the components of the present invention form the device 10 having two opposing vertical legs that in application, adjustably straddle newly laid masonry units pinning down temporary weather sheeting to deflect inclement weather from entering masonry cores and/or cavities.

Figure 2:
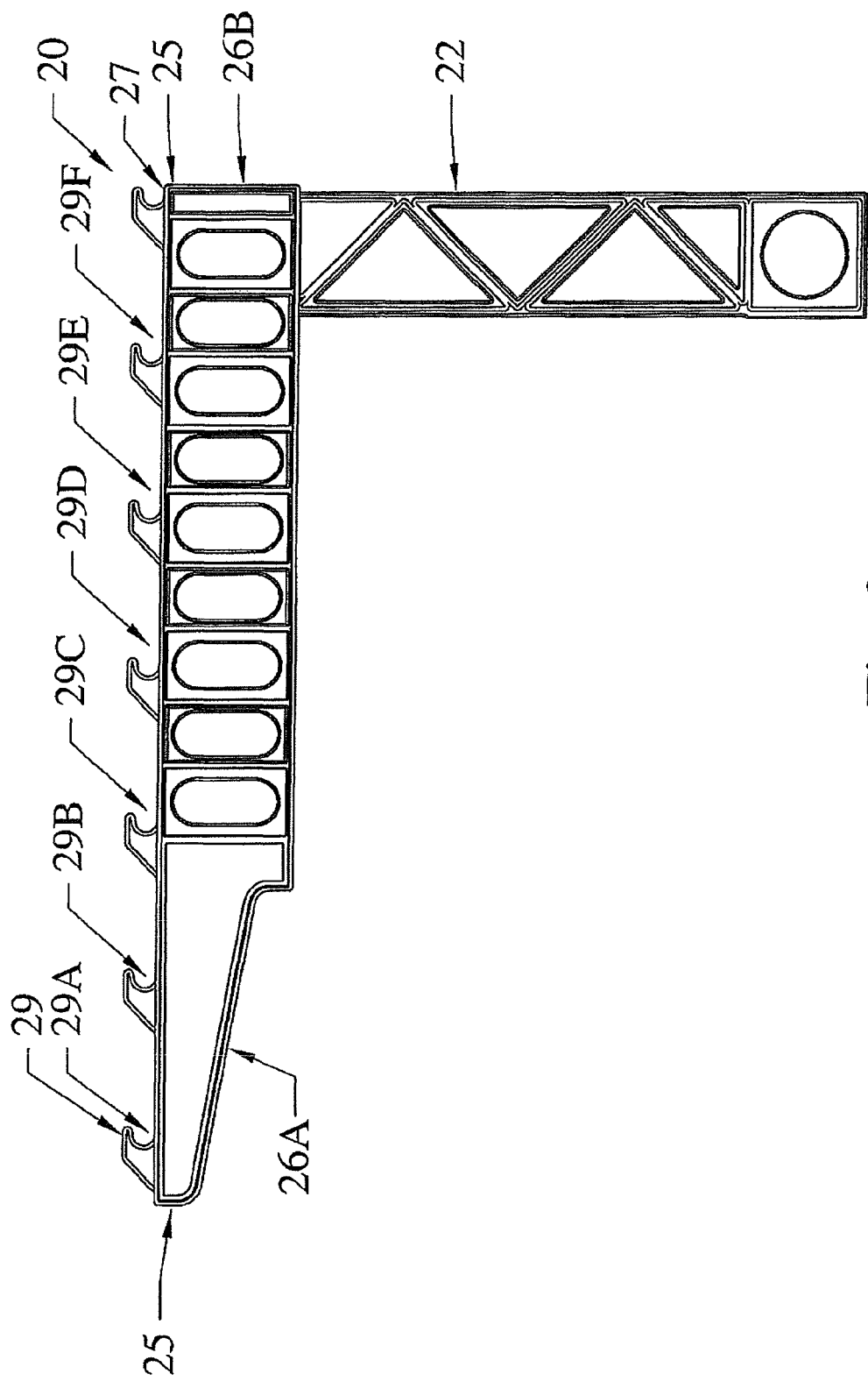
FIG. 2 is a front view of a first member of the device illustrated in FIG. 1.
Figure 5:
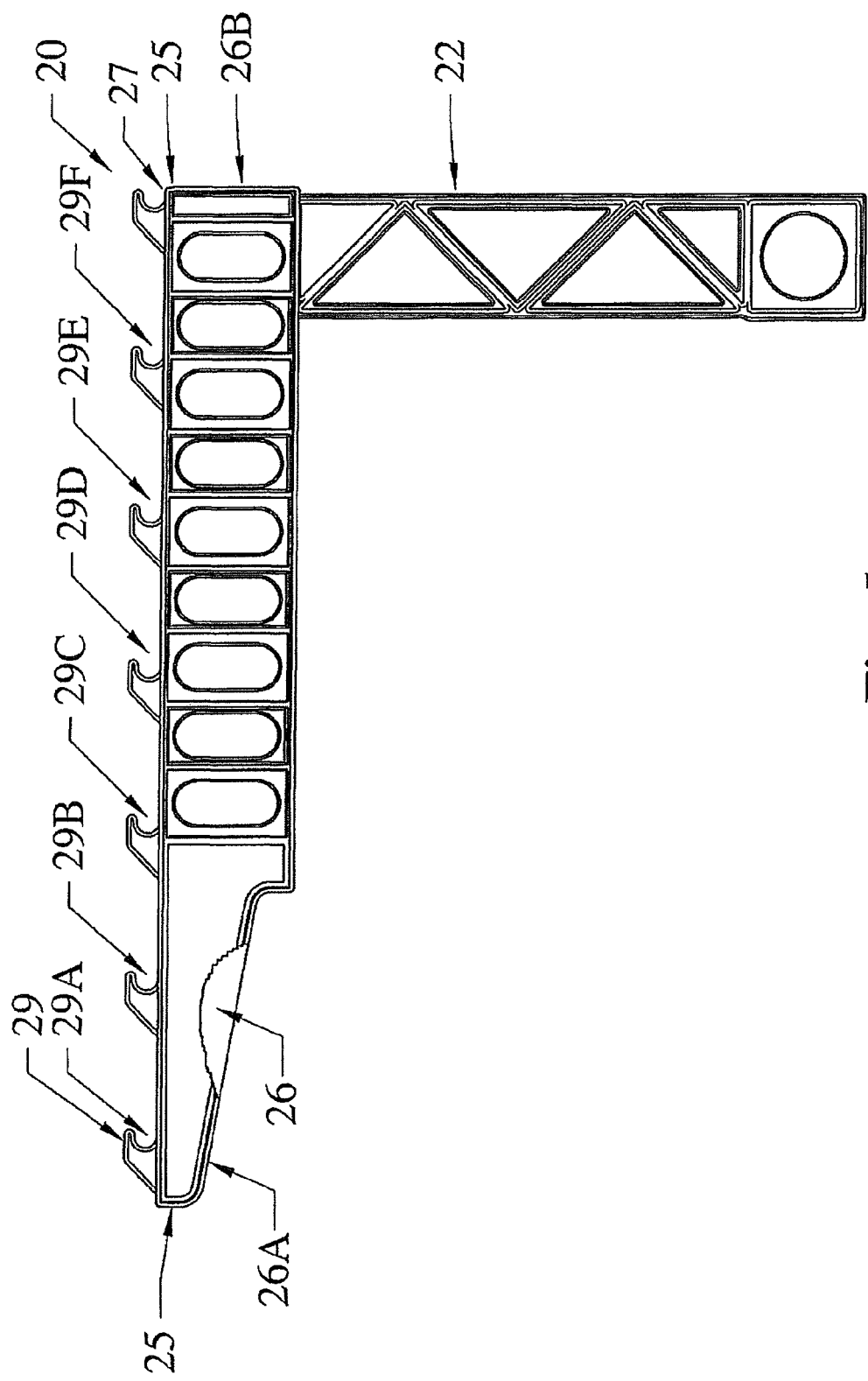
FIG. 5 is a sectional view of the first member illustrated in FIG. 2.

Referring to FIGS. 2 and 5, the first member 20 is defined by a vertical first leg 22 and an integral horizontal first leg 25. The first leg 25 having a top edge 27 that defines a plurality of position slots generally and collectively referred to as numeral 29 and each position slot individually marked for purposes of further description as 29A, 29B, 29C, 29D, 29E, 29F and 29G. The position slots 29 preferably extend the longitudinal length of the top edge 27, and, as will be understood, are for releasably adjusting the width of the device 10 for the width of the masonry wall. Further while FIG. 2 illustrates the top edge 27 defining seven (7) position slots 29 it will be appreciated that additional or a lesser number of slots 29 can be available.

In the preferred embodiment, each of the position slots 29 are separated at two-inch increments, however, it will be appreciated that there can be other increments as well.

Figure 3:
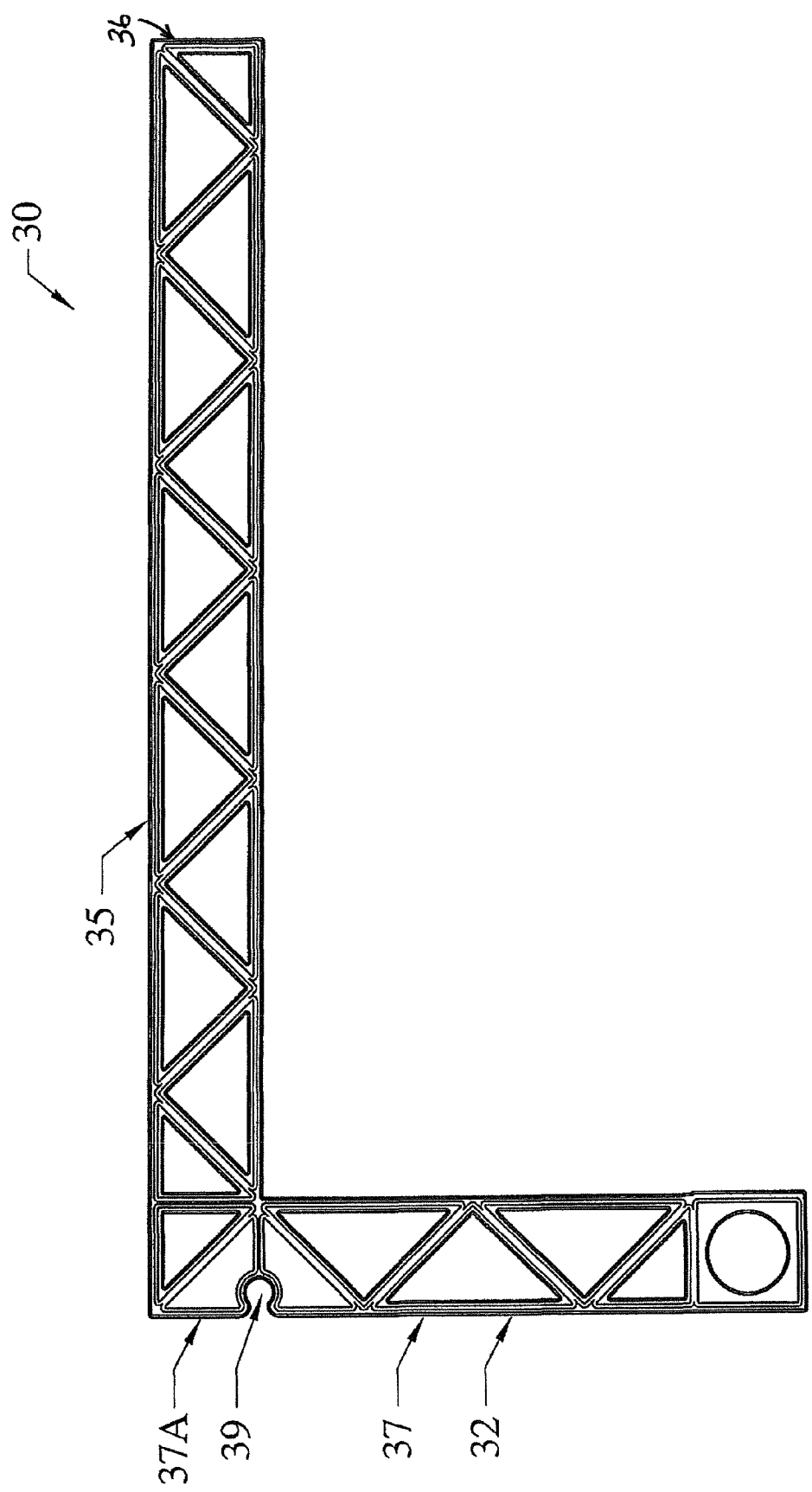
FIG. 3 is a front view of a second member of the device illustrated in FIG. 1.

Referring to FIG. 3, the second member 30 is defined by a vertical second leg 32 and an integral horizontal second leg 35. The second leg 32 having an outer edge 37 that includes a position slot 39 disposed near an upper end 37A of the outer edge 37. As will be understood, the position slot 39 is used in cooperation with the position slots 29 for releasably adjusting the width of the device 10 for the width of the masonry wall.

The first member 20 is connected to the second member 30. In the preferred embodiment, the first leg 25 further defines an inner bore 26 (see FIG. 5) that preferably extends the length of the first leg 25. The bore 26 is sized and shaped to receive the horizontal second leg 35 and as will be described, for adjustably sliding the horizontal second leg 35 through the bore 26. The bore 26 having a first opening 26A to receive an edge 36 of the leg 35 and a second opening 26B such that the edge 36 is received and can be slidingly positioned through the bore 26 of the first leg 25. As should now be understood, positioning of the edge 36 within the bore 26 effectively adjusts the distance between the vertical legs 22, 32. For example, as the edge 36 slidingly passes through the bore 26, the distance between the vertical legs 22, 32 decreases. This is important so that in application, the distance "D" (see FIG. 1) between the vertical legs 22, 32 can be adjusted to the approximate width "W" (see FIG. 4) of the top of the masonry wall.

Figure 4:
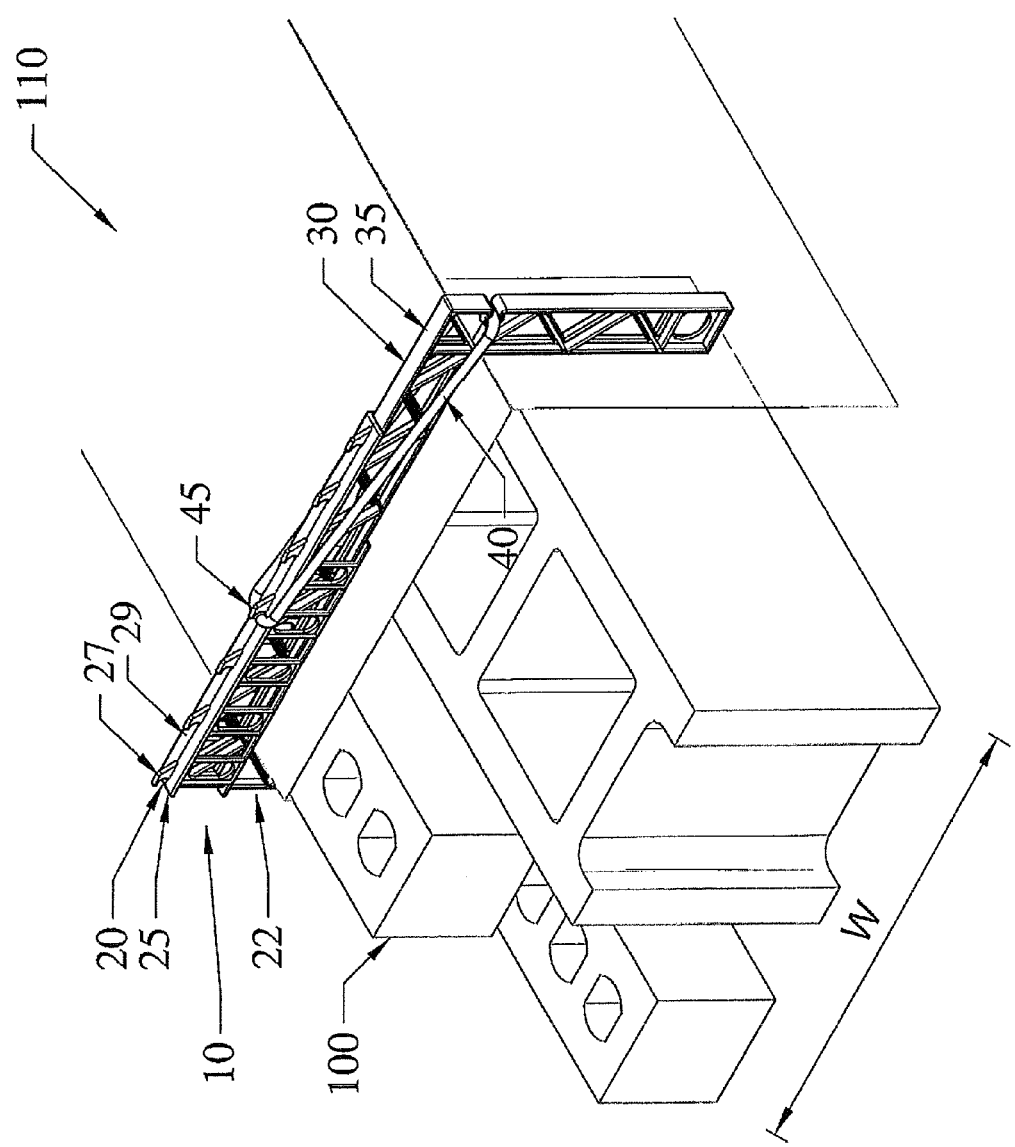
FIG. 4 is a perspective view illustrating the masonry wall protection device of FIG. 1 secured to a masonry wall.

Referring to FIG. 4, the masonry wall protector 10 can be easily positioned simply by placing it on the top of the weather sheeting 110 draped over the wall 100 and adjusting as follows: once the distance D of the device 10 is adjusted to the width W of the masonry wall 100 as described above, a first end 42 of the tensioning belt 40 is engaged with the slot 39 of the second leg 32 and an opposite end 45 of the tensioning belt 40 is selectively engaged with one of the positioning slots 29 along the top edge 27 of the first leg 25 so that the belt 40 extends between slots 29, 39. In position as described, it is critical that the belt end 45 is placed in the proper position slot so that the tensioning belt 40 is stretched and the vertical legs 22, 32 are firmly positioned the selected distance apart.

As should now be understood, the present device can be adjusted to various widths, such as eight-inch, ten-inch, twelve-inch, fourteen-inch, sixteen-inch, eighteen-inch, twenty-inch widths, etc., to accommodate the various widths of the wall.

In application, the device 10 is adjusted to secure weather sheeting 110 to a newly laid masonry 100 by a tight, friction fit (the vertical legs 22, 32 grip the newly laid wall), eliminating the need for additional lumber and masonry block to hold down the temporary weather sheeting. The device 10 provides masons with a much more efficient and safe method of securing temporary weather sheeting to the top of the newly laid masonry walls, eliminating the present cumbersome and unreliable industry standard of protecting newly laid masonry. Further, since the wall protector of this invention will be more snuggly fit on the top of the newly laid wall, wind and other natural forces of nature will not be able to place much force on the wall protector, thereby keeping the water out of the cores.

In the preferred embodiment, the first and second members 20, 30 are constructed of resilient plastic materials. The preferred resilient plastic materials used in making the fresh masonry wall protector disclosed herein are relatively inexpensive, and which can be reused time and time again. The tensioning belt 40 is generally constructed of a suitable resilient or elastic material such as rubber that permits some flexibility, expansion and stretching of the tension belt 40 for purposes of stretching the belt 40 between the first and second members 20, 30, as described.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

I claim:

1. A masonry wall protection device for securing weather sheeting to a newly laid masonry, said protection device comprising:
   a first member having a first vertical leg and a first horizontal leg that includes a plurality of positions,
   a second member having a second horizontal leg and a second vertical leg that includes a position, and
   a tensioning belt,
   wherein said first horizontal leg further defines a bore that extends the length of the first horizontal leg, said bore sized and shaped for sliding receipt of the second horizontal leg such that the second horizontal leg can be slidingly positioned through the bore so that the first and second vertical legs is a selected distance apart,
   said tensioning belt including a first end and an opposite end, wherein said first end is engaged with said position of said second vertical leg and said opposite end is selectively engaged with one of said plurality of positions of said first horizontal leg such that the tensioning belt extends between said first and second members and such that said tensioning belt is stretched.

2. The protection device as recited in claim 1, wherein each of said plurality of positions of said horizontal leg are separated at two-inch increments.

3. The protection device as recited in claim 2, wherein said first horizontal leg includes seven (7) positions.

4. The protection device as recited in claim 1, wherein said first and second members are constructed of a resilient plastic material.

5. The protection device as recited in claim 1, wherein said tensioning belt is constructed of a resilient, elastic material.

6. The protection device as recited in claim 5, wherein said resilient, elastic material is rubber.

7. A masonry wall protection device for securing weather sheeting to a newly laid masonry, said protection device comprising:
   a first member that defines a first vertical leg and a first horizontal leg, said first horizontal leg having a top edge that defines a plurality of slots,
   a second member that defines a second vertical leg and a second horizontal leg, said second vertical leg having an outer edge that defines at least one slot,
   a tension member having a first end and a second end,
   a passage in said first horizontal leg, said passage sized and shaped for sliding receipt of said second horizontal leg,
   wherein said first end is engaged with said slot of said second vertical leg, and wherein said second end is selectively engaged with one of said slots of said first horizontal leg such that said tension member is stretched.

8. The protection device as recited in claim 7, wherein said second horizontal leg can be slidingly positioned through said passage in order to select a distance between said first and second vertical legs.

9. The protective device as recited in claim 8, wherein said distance is for placing the protection device on top of a newly laid masonry such that the top of the newly laid masonry is positioned snuggly between the first and second vertical legs.

10. The protective device as recited in claim 7, wherein each of said plurality of slots along said top edge are separated at two-inch increments.

11. The protective device as recited in claim 10, wherein said top edge defines seven (7) slots.

12. A masonry wall protection device for securing weather sheeting to a newly laid masonry, said protection device comprising:
- a first member that defines a first vertical leg and a first horizontal leg, said first horizontal leg having a top edge that defines a plurality of slots,
- a second member that defines a second vertical leg and a second horizontal leg, said second vertical leg having an outer edge that defines at least one slot,
- coupling means for connecting said first member to said second member such that said first and second vertical legs are positioned to straddle a newly laid masonry, said coupling means includes a tension member having a first end and second end, wherein said first end is engaged with said slot of said second vertical leg, and wherein said second end is selectively engaged with one of said slots of said first horizontal leg such that the tension member is stretched.

13. The protection device as recited in claim 12, wherein a passage is defined in said first horizontal leg, said passage sized and shaped for sliding receipt of said second horizontal leg for adjusting the distance between said first and second vertical legs.

14. The protection device as recited in claim 12, wherein each of said slots in said top edge are separated at two-inch increments.

15. The protection device as recited in claim 14, wherein said top edge defines seven (7) slots.

16. The protection device as recited in claim 12, wherein said first and second members are constructed of a resilient plastic material.

17. The protection device as recited in claim 12, wherein said tension member is constructed of an elastic material.

18. The protection device as recited in claim 17, wherein said elastic material is rubber.

\* \* \* \* \*